United States Patent [19]

Yokelson et al.

[11] Patent Number: 5,187,254

[45] Date of Patent: Feb. 16, 1993

[54] AMIDE-IMIDE RESIN HAVING PHTHALIC ANHYDRIDE MOIETIES

[75] Inventors: Howard B. Yokelson, Aurora; James H. Han, Naperville; Jeff J. Felberg, River Forest, all of Ill.

[73] Assignee: Amoco Corporation, Chicago, Ill.

[21] Appl. No.: 768,006

[22] Filed: Sep. 30, 1991

Related U.S. Application Data

[63] Continuation-in-part of Ser. No. 708,493, May 31, 1991, Pat. No. 5,124,428.

[51] Int. Cl.$^5$ .................. C08G 18/28; C08G 18/77
[52] U.S. Cl. ......................... 528/73; 528/350; 26 A/178 R; 26 A/178 F
[58] Field of Search ............ 528/73, 358; 264/178 R, 264/178 F

[56] References Cited

U.S. PATENT DOCUMENTS 5,124,428  6/1992  Yokelson et al. ............... 528/73

Primary Examiner—Morton Foelak
Assistant Examiner—Duc Truong
Attorney, Agent, or Firm—Matthew R. Hooper; Stephen L. Hensley; Frank J. Sroka

[57] ABSTRACT

A melt processible molding resin in which polymeric chains present therein comprise amide-imide repeating units having the following general formula:

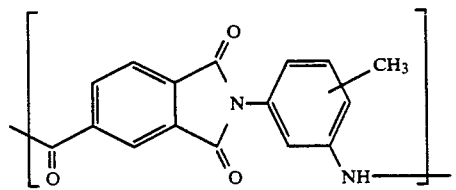

and wherein terminal amine groups of said polymeric chains are endcapped with phthalic anhydride moieties.

8 Claims, 1 Drawing Sheet

AMIDE-IMIDE RESIN HAVING PHTHALIC ANHYDRIDE MOIETIES

RELATED APPLICATION

This application is a continuation-in-part of U.S. Ser. No. 708,493 filed May 31, 1991, now U.S. Pat. No. 5,124,428, which is incorporated herein by reference and made a part hereof.

BACKGROUND OF THE INVENTION

1. Field of the Invention

The present invention relates generally to polyamide-imide molding resins, and, more particularly, to phthalic anhydride modified polyamide-imide resins comprising amide-imide polymer obtained from reactants which comprise the reactant pair trimellitic anhydride chloride (hereafter "TMAC") and toluene diamine ("TDA"); or the reactant pair trimellitic anhydride ("TMA") and toluene diisocyanate ("TDI"). Accordingly, the invention is directed to a melt processible molding resin in which polymeric chains present in the resin comprise amide-imide repeating units having the following general formula:

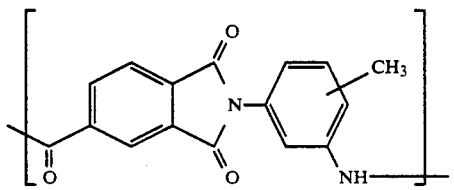

and wherein terminal amine groups of said polymeric chains are endcapped with phthalic anhydride moieties. Phthalic anhydride modified TMA/TDI or TMAC-TDA resins manufactured in accordance with the present invention exhibit improved melt-flow properties and greater thermal stability in the melt in comparison to the same resins without any phthalic anhydride endcapping, or in comparison to the same resins containing endcapping agents other than phthalic anhydride. The surprising improvement in both melt flow and melt thermal stability afforded by the present invention enhances the suitability of TMA-TDI or TMAC-TDA resins for use as engineering polymers in commercial molding applications.

2. Discussion of Background Art

Amide-imide resins are well known for their high temperature properties. In particular, the preparation of aromatic polyamide-imides from either trimellitic anhydride and aromatic diisocyanates, or from trimellitic anhydride chloride and aromatic diamines is disclosed in the literature. For example, R. Pigeon and P. Allard, in a published lecture entitled "Heat-Resistant and Flame-Resistant Fibers" (Die Angewandte Makromolekulare Chemie, Vol. 40/41, No. 600, pp 139–158, 1974) investigated the direct polycondensation reaction in polar solvent of trimellitic acid anhydride with different aromatic diisocyanates. Table 2 of this paper discloses polyamide-imides prepared from trimellitic acid anhydride and the 2,6 or 2,4 isomers of toluene diisocyanate.

Co-author P. Allard of the above-mentioned technical publication is also a named inventor of U.S. Pat. Nos. 3,929,691 and 3,903,058 and a co-inventor of Rochina et al. U.S. Pat. No. 3,717,696, all of which disclose polyamide-imide resins based on the polycondensation products of trimellitic acid anhydride and aromatic diisocyanates.

The Allard '691 patent discloses high molecular weight polyamide-imide copolymers derived from aromatic diisocyanates which contain two benzene nuclei (preferably ODI and MDI), an aromatic acid anhydride (preferably trimellitic acid anhydride), an aromatic or heterocyclic diacid (preferably isophthalic or terephthalic acids) and, optionally, a dianhydride (preferably pyromellitic dianhydride).

The above-mentioned Rochina et al. '696 patent discloses a process for producing polyamide-imide filaments by dry spinning a solution of polyamide-imide under specified conditions. The patent discloses for use as the spinning solution polyamide-imide solutions obtained by reacting in substantially stoichiometric proportions in a polar organic solvent at least one aromatic diisocyanate and an acid reactant containing at least an aromatic acid anhydride (preferably trimellitic acid anhydride) and optionally also at least one di-acid such as terephthalic or isophthalic acid. Toluene diisocyanate is disclosed in the patent as among the suitable diisocyanates for preparing the polyamide-imide solution. The patent also points out that the polyamide-imide can alternatively be prepared by reaction of a diamine with the chloride derivative of the acid anhydride reactant.

The Allard et al. '058 patent, like the patents discussed above, is directed to heat stable fibers based on polyamide-imide resins which are the reaction product of reactants comprising aromatic diisocyanates and aromatic acid anhydrides.

Serres et al. U.S. Pat. No. 3,839,529 discloses preparation of polyamide-imide filaments based on the reaction product of an acyl halide derivative of trimellitic acid anhydride which contains at least one acyl halide group in the 4-ring position, with aromatic primary diamines in polar organic solvents at temperatures below 150° C. The patent discloses, as useful diamines for preparation of the polyamic acids, wholly or largely aromatic primary diamines, particularly aromatic primary diamines containing from 6 to about 10 carbon atoms or aromatic primary diamines composed of two divalent aromatic moieties of from 6 to about 10 carbon atoms, each moiety containing one primary amine group, with the moieties linked directly or through bridging groups such as —O—, —CH$_2$—, —CO—, —SO$_2$—, and —S—. Polyamic acids or polyamide-imides based on toluene diisocyanate or toluene diamine are not specifically disclosed.

The ability to manufacture melt-processible polyamide-imide resin based on toluene diamine or toluene diisocyanate is highly desirable due to the lower cost of these reactants as compared with other diamines such as, for example, 4,4' diisocyanato- (or diamino-) diphenylmethane and 4,4' diisocyanato- (or diamino-) diphenylether. In particular, the lower cost of toluene diisocyanate versus toluene diamine makes especially desirable the capability of producing a melt-processible TMA-TDI resin. Unfortunately, although the TMA/TDI and TMAC-TDA resins offer substantial cost savings over other amide-imide molding resins, there exists a need for improvement in the melt-flow and thermal melt stability of these resins in order to enhance the commercial suitability of the resins as engineering polymers for various high temperature molding applications. For example, the Tg of TMA-TDI resin having an I.V. of 0.5 is about 350° C., while the decomposition temperature of the resin, as determined by thermogravimetric analysis is about 420° C. Given this narrow window for melt processing, temperatures high enough to melt the resin will cause substantial polymer degradation and little if any appreciable melt flow in the resin. It is desired to widen the melt processing window, between the Tg of the polymer and the decomposition temperature, in order to afford greater manufacturing latitude in molding operations. In addition, if the decomposition temperature of the polymer can be raised, the overall thermal stability of products manufactured from the TMA-TDI or TMAC-TDA can be enhanced.

The modification of certain amide-imide resins, which are chemically distinct from the amide-imide resins dealt with in the present invention, has been disclosed in the art. In this regard, Hanson U.S. Pat. Nos. 4,448,925 and 4,722,992 disclose injection moldable amide-imide phthalamide polymers comprising phthalic anhydride moieties. In particular, Hanson '925 discloses that the incorporation of from about 1 to about 10% phthalic anhydride in the polyamide-imide phthamide polymers greatly improves the flow property of these resins. In addition to phthalic anhydride, the '992 patent discloses incorporation of 1 to 10% aniline or TMA for improved flow properties. Neither of the Hanson patents discloses or suggests the incorporation of phthalic anhydride in amide-imide resins based on TMA-TDI or TMAC-TDA.

A general object of the present invention is to improve the melt processibility of amide-imide molding resins based on TMA-TDI or TMAC-TDA. Other objects will become apparent hereinafter to those skilled in the art.

SUMMARY OF THE INVENTION

We have now found that the above objects can be obtained in a melt processible molding resin in which polymeric chains present therein comprise amide-imide repeating units having the following general formula:

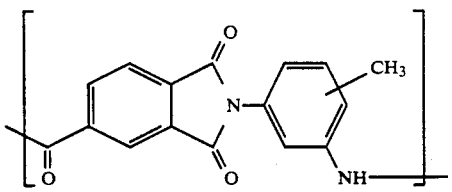

and wherein terminal amine groups of said polymeric chains are endcapped with phthalic anhydride moieties.

Resins particularly well-suited for end-capping with phthalic anhydride according to the present invention are the TMA-TDI and TMAC-TDA resins disclosed in commonly assigned copending U.S. Ser. No. 708,493, the disclosure of which is incorporated herein and made a part hereof, wherein said resins have inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3. However, it should be understood that the present invention is generally applicable to any TMA-TDI or TMAC-TDA amide-imide resin having a degree of polymerization rendering the material suitable for molding applications.

In accordance with the present invention, it is prefered to maximize the extent to which free amine terminal groups in the amide-imide resin are end-capped with phthalic anhydride so as to maximize improvements in the melt flow properties and thermal stability of the molten resin. For purposes of the present invention the terms "phthalic anhydride modified" or "phthalic anhydride endcapping" or similar terminology is intended to denote that terminal amine groups in the resin have been converted to terminal phthalimide groups as represented by the structure shown below in which R represents the remainder of the amide-imide polymer chain:

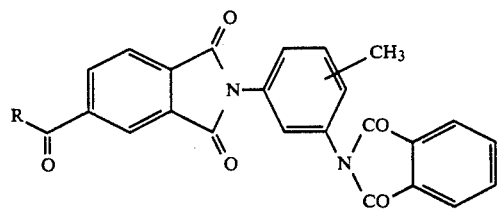

Generally, the preferred amount of phthalic anhydride present in the polymer chains of the resin should correspond to a molar ratio of the anhydride to terminal amine groups of about 1:1 so that essentially all terminal amine groups present in the polymer chains of the resin are end-capped. While the exact theoretical amount of phthalic anhydride required to do this can be determined based on a conventional titration of the polymer, it can be assumed that one end group in each polymer chain is a terminal amine group where the reactant ratio of TMA to TDA or TMAC to TDA is about 1:1. Thus, it is generally sufficient for obtaining the benefits of the present invention to use a molar ratio of phthalic anhydride to polymer (based on Mn of the polymer) of about 1:1 to about 10:1. The phthalic anhydride may be incorporated in the resin by including the anhydride as a reactant in the polymerization of TMA-TDI or TMAC-TDA, or by reacting the anhydride with the already prepared resin.

The phthalic anhydride modified resins of the present invention have superior thermal stability and rheological behavior compared to the unmodified resins, and can be used commercially as engineering resins in high temperature environments where thermally stable molded articles, films, laminates and fibers are required. For example, the phthalic anhydride endcapped resins of the present invention can be used for making thermally stable fiber in accordance with copending, commonly assigned U.S. Ser. No. 708,493.

DETAILED DESCRIPTION

Figure 1:
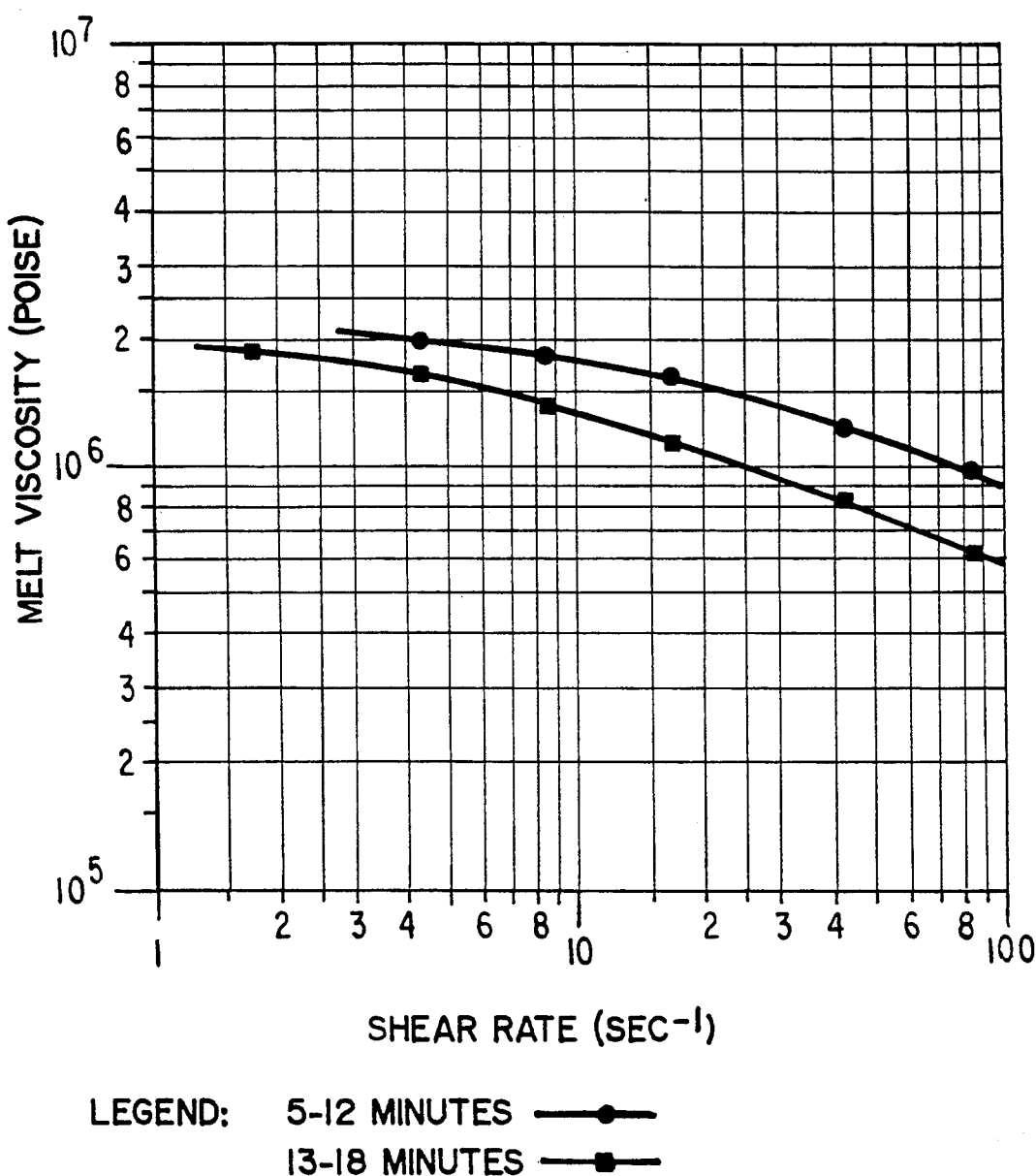
FIG. 1 is a flow curve for a phthalic anhydride endcapped TMA-TDI resin prepared according to Example I. It should be noted that the non-endcapped TMA-TDI resin did not flow at 370° C. and no rheology data could be obtained.

Generally speaking, resins according to the present invention having improved melt flow and improved thermal stability comprise the polymeric condensation product of either the reactant pair trimellitic anhydride chloride ("TMAC") and toluene diamine ("TDA") or the reactant pair trimellitic anhydride ("TMA") and toluene diisocyanate ("TDI"). The reaction pathway leading to the amide-imide polymer of the present invention based upon either reactant pair can be generally represented as follows:

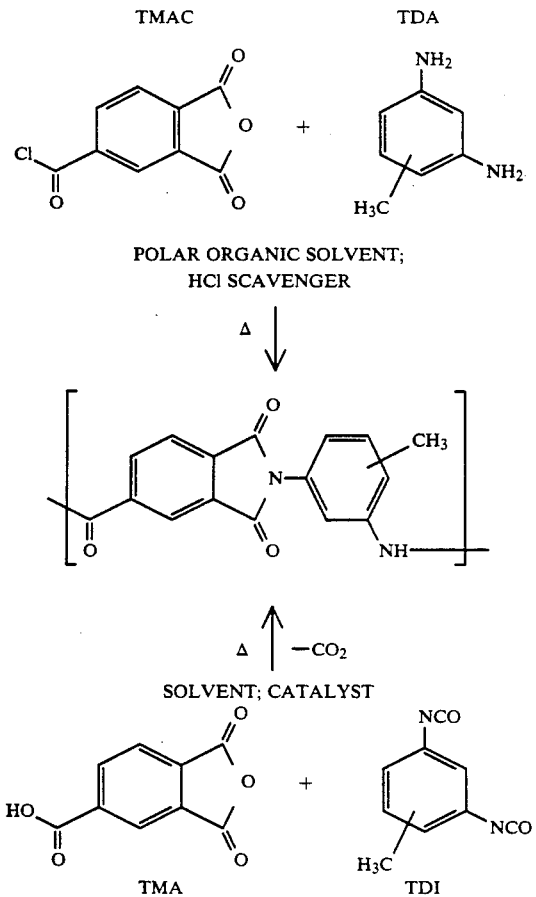

The resin of the present invention can also contain minor amounts of other units derived from different diamines such as hexamethylene diamine, metaphenylene diamine, oxybisaniline, methylene bisaniline, or the corresponding diisocyanates. If desired, a further reduction in the cost of the resins of the present invention can be realized by incorporation of minor amounts aromatic or aliphatic diacids such as terephthalic acid, isophthalic acid or adipic acid.

TMA-TDI polyamide-imide resin suitable for use in the present invention can have the inherent viscosity and molecular weight characteristics of the TMA-TDI resin disclosed in the above mentioned U.S. Ser. No. 708,493, namely, an inherent viscosity in the range of from about 0.5 to about 0.9 dl/g; and $M_n$ in the range of from about 5000 to about 10,000 g/mole; a ratio of $M_w/M_n$ in the range of from about 2.1 to about 2.6; and a ratio of $M_z/M_w$ in the range of from about 1.7 to about 2.3; whereas a TMAC-TDA polyamide-imide resin suitable for use in the present invention can have an inherent viscosity in the range of from about 0.7 to about 1.0 dl/g; an $M_n$ of from about 9000 to about 14,000 g/mole; a ratio of $M_w/M_n$ in the range of from about 2.0 to about 3.0; and a ratio of $M_z/M_w$ of from about 1.6 to about 2.0, which characteristics are also disclosed in the above-mentioned '493 application. The inherent viscosity and molecular weight characteristics of the resins used in the present invention can be determined using the techniques disclosed in the copending '493 application which is incorporated herein by reference.

Preparation of either TMAC-TDA or TMA-TDI resins for use in the present invention can generally be described as solution imidization. In the particular case of TMAC-TDA resin, polycondensation of the reactants to form a polyamic acid intermediate is carried out in an appropriate reaction solvent, followed by in situ imidization of the amic-acid groups to imide groups. Based on manufacturing cost considerations, preparation of the amide-imide resin by solution imidization is preferred over processes in which a polyamic acid intermediate is precipitated from solution and then, in a separate step, cured to achieve imidization. If desired, the amide-imide resins of the present invention can also be prepared neat.

In somewhat greater detail, solution imidization of the reactant pair TMAC-TDA can be carried out by reacting trimellitic anhydride chloride ("TMAC") and toluene diamine ("TDA") in an appropriate reaction solvent and in the presence of a suitable acid scavenger in a molar ratio of from about 1:1. If desired, a slight (about 1 mole percent) excess of TDA can be used to provide more terminal amine groups in the polymer for subsequent reaction with phthalic anhydride. Commercially obtained TMAC can be used in the present invention. Commercially obtained TDA in the form of a 20:80 mixture of the 2,6 and 2,4 isomers of TDA can be used as received without further purification for preparing a TMAC-TDA resin of the present invention.

Suitable polar organic solvents which can be used in the present invention include dimethylformamide, dimethylacetamide, hexamethylphosphotriamide, tetramethylenesulphone, gamma butryrolactone, and preferably N-methylpyrollidone. Suitable acid scavengers, required to remove HCl which is generated in the TMAC-TDA reaction, include triethylamine, calcium carbonate and calcium oxide. The latter two form soluble salts upon reaction with HCl and are therefore preferred over triethylamine which forms an insouble salt requiring filtration of the amide-imide solution. Calcium carbonate is most preferred as an acid scavenger because its reaction with HCl to produce water (which can interfere with the polycondensation) takes place at a sufficiently slow rate that the polycondensation reaction can be conducted at about room temperature without substantial detriment thereto caused by the formation of water. Use of calcium oxide as the acid scavenger requires that the TMAC-TDA reaction be conducted at a temperature not exceeding about $-20°$ C. due to rapid generation of water which occurs if the reaction is run at room temperature.

Reaction of the TMAC and the TDA is carried out essentially to completion at a sufficiently mild temperature, preferably about room temperature in the case when calcium carbonate is the acid scavenger, such that polymeric linkages resulting from reaction of anhydride groups and amine groups are predominantly in the form of amic-acid moieties. The reaction can be conducted by adding TMAC slowly to a reaction vessel containing TDA, solvent and the appropriate acid scavenger. Following addition of all the TMAC reactant, the reaction mixture can be stirred for about 30 minutes up to about two hours at about room temperature to essentially completely react the TMAC and TDA. Under these conditions of time and temperature, at least a majority of the polymeric linkages derived from anhydride moieties are present in the form of amic-acid linkages. Generally, while up to about 20% of the anhydride-derived linkages may be in the form of imide linkages under the above-described mild conditions, a more typical range is about 5 to 10%.

Following formation of the polyamic-acid solution as described above, the solution is then heated at a temperature within the range of from about 130° C. to about 180° C. for an amount of time sufficient to (1) convert greater than about 90%, and preferably essentially all of the amic-acid linkages, to imide linkages; and (2) continue chain extension of the amide-imide polymer. While imidization can be completed in about 1 hour, the chain extension of the polyamide-imide generally requires about 8 to about 14 additional hours. Before initiating the imidization reaction, toluene can be added to the reaction vessel so that water produced during the polymerization/imidization reactions can be stripped from the reaction vessel under nitrogen in the form of a toluene-water azeotrope.

In addition to resin based upon the reaction of TMAC and TDA, the present invention is further directed to resin comprising an amide-imide polymer which is isostructural with the TMAC-TDA resin, but which is obtained by reacting trimellitic anhydride ("TMA") and toluene diisocyanate ("TDI"). Preparation of the TMA-TDI resin can be carried out by reacting TDI and TMA in a mole ratio of from about 1:1, in a solvent in the presence of a suitable catalyst, at a temperature in the range of from about 150° C. to about 200° C., until there is obtained a solution of amide-imide polymer in which the polymer has an inherent viscosity suitable for resin moding applications. A slight molar excess of TDI versus TMA is preferable for obtaining polymer having terminal amine groups for reaction with phthalic anhydride in accordance with the present invention. TDI was used in the form of a 20:80 mixture of the 2,6 and 2,4 isomers. Suitable solvents are as described for the TMAC-TDA preparation. Suitable catalysts for the TMA-TDI reaction include methanol, water, phosphorous compounds such as 3-methyl-1-ethyl-3-phospholene-1-oxide and diamine compounds such as triethylenediamine-1,4-diazobicyclo[2.2.2]octane.

The reaction of TMA and TDI can be carried out in a gradual or staged fashion. For example, at the outset of the reaction, TDI can be added slowly over a period of from about 1 to about 3 hours to a reaction vessel comprising the trimellitic anhydride, solvent and catalyst. During the TDI addition, and for a period of about 1-6 hours thereafter, the reaction vessel may be maintained at a temperature within the range of about 75° C. to about 95° C. Following this stage, the temperature of the reaction vessel may be increased to about 120° C. to about 150° C. and maintained there for about 2 to about 6 hours. Upon completion of this second stage of heating, the temperature can again be increased from about 160° C. to about 200° C. and maintained there for about 4 to about 8 hours. While the foregoing describes a staged reaction, it is also possible to achieve similar results using a procedure in which the temperature is gradually increased instead of being ramped up in discrete increments.

Reaction of either the TMA-TDI or the TMAC-TDA resin with phthalic anhydride to obtain the end-capped resin of the present invention may be carried out by reacting the resin with an amount of phthalic anhydride sufficient to result in a resin which exhibits improved melt flow properties and melt stability over the non-endcapped resin. It is generally desirable to endcap each all free terminal amine groups in the polymer in order to maximize the benefits attendant to the present invention. It is recommended therefore to use an excess amount of phthalic anhydride in the range of from about 1 to about 10 moles of phthalic anhydride, per mole of resin, where the moles of resin is calculated as grams of the resin divided by $M_n$ of the resin. The end-capping reaction can be conducted by adding the phthalic anhydride to a solution of the resin in an organic solvent (e.g. NMP) and stirring the reaction mixture for about 1 to 3 hours while maintaining a reaction temperature of about 40 to about 70° C. The solid reaction product can then be collected, washed with water, and dried in a vacuum oven at about 100 to about 130° C. for 1-2 days, followed by additional drying at 220° C. for about 3 to 6 hours.

The end-capped amide-imide resins of the present invention function as engineering resins suitable for use in molding a variety of products which require excellent high temperature properties and toughness. Although compression molding of the resins of the present invention is preferred over injection molding, the improvements in melt processibility and thermal stability afforded by the present invention can enhance the suitability of these resins for a variety of molding applications. In particular, conventional compression molding techniques which are well known in the art can be facilitated by the present invention due to the wider molding latitude which the invention affords. If desired, the resins of the present invention can be filled with a variety of materials commonly employed as fillers for thermoplastic resins. Examples include fibrous materials such as glass and graphite fibers; particulates such as kaolin, silica, calcium carbonate, barium sulfate, alumina powder, mica, talc, and glass beads. In addition, the resins of the present can be blended with other thermoplastic materials, and additives such as PTFE and $TiO_2$.

The following examples are provided only for the purpose of illustration and are not intended to limit the invention defined in the appended claims.

COMPARATIVE EXAMPLE I

Preparation of TMA/TDI Polymer Without End-capping

To a solution of 192 g (1.0 mole) of TMA and 20.8 g (0.18 mole) of triethylenediamine in 0.8 L of distilled NMP at 90° C., was added 176 g (1.01 mole) of TDI over one hour. The reaction was mechanically stirred, and the temperature was maintained at 90° C. for 20 hours, then increased to 140° C. for two hours. After cooling to room temperature, the reaction mixture was poured into a large excess of water. The solids were collected and washed thoroughly with water before drying in a vacuum oven at 130° C. overnight, and 4 hours at 220° C.; the isolated yield was 269 g (97%). I.V.=0.49 dl/g, Tg=348° C., and TGA=420° C. GPC results: Mn=5190, Mw=10990, Mz=18210

EXAMPLE I

Preparation of TMA/TDI Polymer End-Capped with Phthalic Anhydride

To a solution of 75 g (0.015 mol) of TMA/TDI polymer (12537-15) in 0.26 L of distilled NMP at 60° C. was added 11 g (0.075 mol) of phthalic anhydride. The reaction mixture was stirred at 60° C. for 2 hours, and then poured into a large excess of water. The pale yellow solids were collected and washed thoroughly with water before drying in a vacuum oven at 110° C. for 48 hours, and then 220° C. for 4 hours; the isolated yield was 71 g (95%). I.V.=0.43 dl/g. Tg=335° C., and TGA=442° C. GPC results: Mn=6100, Mw=13015, Mz=21100

COMPARATIVE EXAMPLE II

Preparation of TMA/TDI Polymer End-Capped with Aniline

To a solution of 75 g (0.015 mol) of TMA/TDI polymer (Comp Ex. I) in 0.25-L of distilled NMP at 60° C. was added 7.0 g (0.075 mol) of aniline. The reaction mixture was stirred at 50° C. for 2 hours, and then poured into a large excess of water. The pale yellow solids were collected and washed thoroughly with water before drying in a vacuum oven at 110° C. for 48 hours, and then 220° C. for 4 hours; the isolated yield was 65 g (87%). I.V.=0.42 dl/g, Tg=355° C., and TGA=402° C. GPC results: Mn=5980, Mw=12280, Mz=19970.

COMPARATIVE EXAMPLE III

Preparation of TMA/TDI Polymer End-capped with Phenyl Isocyanate

To a solution of 75 g (0.015 mol) of TMA/TDI polymer (Comp. Ex. I) in 0.26-L of distilled NMP at 60° C. was added 8.9 g (0.075 mol) of phenyl isocyanate. The reaction mixture was stirred at 50° C. for 2 hours. Gas evolution was noted during this period. Then, the mixture was poured into a large excess of water. The pale yellow solids were collected and washed thoroughly with water before drying in a vacuum oven at 110° C. for 48 hours, and then 220° C. for 4 hours; the isolated yield was 72 g (96%). I.V.=0.36 dl/g, Tg=321° C., and TGA=401° C. GPC results: Mn=6010, Mw=11280, Mz=17895.

Melt flow rates for the resins prepared in the above examples were determined at 380° C. with a 2-minute preheat time and a 5000 gram load using a Tinus-Olsen high temperature extrusion plastometer. The rheology was performed at 370° C. using a 0.25"×0.06" capillary die with a preheat time of 5 minutes. The shear rate range of 1.74–86.8 sec-1 was covered in ascending order over a residence time of 5-12 minutes. Following this portion of the run, the shear rate was reduced to 1.74 sec-1 and the data were retaken at longer residence time (13-18 minutes) in order to assess the melt stability of the material. Table I, below, illustrates the improvement in melt flow brought about by the present invention. Comparative examples II and III demonstrate that end-capping with aniline or phenylisocyanate produced a resin having poor thermal stability as indicated by the highly foamed extrudate. The poor performance of aniline and phenylisocyanate as end-capping agents for the resins of the present invention, as compared to phthalic anhydride, demonstrates the non-obviousness of the present invention whereby phthalic anhydride end-capping not only improves the flow properties of the TMA-TDI or TMAC-TDA resins, but also improves the thermal stability of the resins in the molten state. A further indication that phthalic anhydride end-capping improves the melt flow of the resins of the present invention is that the phthalic anhydride end-capped resin was found to exhibit newtonian flow characteristics under low shear in the rheology study described above. This is indicated by the flow data graphically depicted in FIG. 1.

TABLE I

| Sample ID | Description | IV (dl/g) | Tg (°C.) | TGA (°C.) | MFR (g/10 min.) | Appearance of Extrudate |
|---|---|---|---|---|---|---|
| Comp. Ex. I | Unmodified | 0.49 | 348 | 420 | No Flow | — |
| Ex. I | Phthalic Anhydride | 0.43 | 335 | 442 | 0.4046 | non-foamed |
| Comp. Ex. II | Aniline | 0.42 | 355 | 402 | 0.4130 | highly foamed |
| Comp. Ex. III | Phenyl Isocyanate | 0.36 | 321 | 401 | 69.867 | highly foamed |

MFR = Melt Flow Rate
IV = Inherent Viscosity
TGA = Decomposition temperature as determined by thermal gravimetric analysis
Tg = Glass transition temperature

We claim:

1. A melt-processible molding resin in which polymeric chains present in the resin comprise amide-imide repeating units having the following general formula:

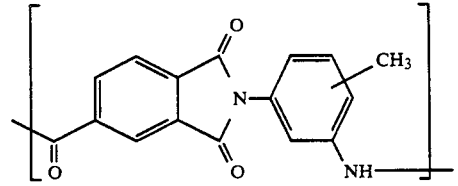

and wherein terminal amine groups of said polymeric chains are endcapped with phthalic anhydride moieties.

2. The molding resin of claim 1 wherein the molding resin has an inherent viscosity of from about 0.3 to about 1.3 dl/g; and $M_n$ of at least about 5000 g/mole; a ratio of $M_w/M_n$ in the range of from about 1.7 to about 3.3; and a ratio of $M_z/M_w$ of not greater than about 2.3.

3. The molding resin of claim 1 comprising the reaction product of trimellitic anhydride and toluene diisocyanate, and wherein substantially all of said terminal amine groups are end-capped.

4. The molding resin of claim 3 wherein the resin has inherent viscosity in the range of from about 0.5 to about 0.9 dl/g; an $M_n$ in the range of from about 5000 to about 10,000 g/mole; a ratio of $M_w/M_n$ in the range of from about 2.1 to about 2.6; and a ratio of $M_z/M_w$ in the range of from about 1.7 to about 2.3.

5. The molding resin of claim 1 comprising the reaction product of trimellitic anhydride chloride and toluene diamine, and wherein substantially all of said terminal amine groups are end-capped.

6. The molding resin of claim 5 wherein the resin has inherent viscosity in the range of from about 0.7 to about 1.0 dl/g; an $M_n$ of from about 9000 to about 14,000 g/mole; a ratio of $M_w/M_n$ in the range of from about 2.0 to about 3.0; and a ratio of $M_z/M_w$ of from about 1.6 to about 2.0

7. A molded article comprising the molding resin of claim 1.

8. Fiber comprising the molding resin of claim 1.

* * * * *